United States Patent
Maslov et al.

(10) Patent No.: US 6,812,661 B2
(45) Date of Patent: Nov. 2, 2004

(54) MULTIPHASE MOTOR HAVING WINDING CONNECTIONS SPECIFIC TO RESPECTIVE OPERATING SPEED RANGES

(75) Inventors: Boris A. Maslov, Reston, VA (US); Zareh Soghomonian, Sterling, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 84 days.

(21) Appl. No.: 10/290,505

(22) Filed: Nov. 8, 2002

(65) Prior Publication Data

US 2004/0090196 A1 May 13, 2004

(51) Int. Cl.[7] ................................................. H02P 7/00
(52) U.S. Cl. ..................... 318/268; 318/254; 318/252; 318/251; 310/216; 310/218; 310/259
(58) Field of Search ................................ 318/254, 251, 318/252, 268, 772, 823; 310/216, 218, 259, 217

(56) References Cited

U.S. PATENT DOCUMENTS

| | | | | |
|---|---|---|---|---|
| 4,012,651 A | * | 3/1977 | Burson | 310/153 |
| 4,315,171 A | * | 2/1982 | Schaeffer | 310/49 R |
| 4,511,831 A | * | 4/1985 | McInnis | 388/803 |
| 4,823,067 A | * | 4/1989 | Weber | 318/799 |
| 4,937,513 A | * | 6/1990 | Hoemann et al. | 318/772 |
| 4,990,809 A | * | 2/1991 | Artus et al. | 310/192 |
| 5,015,903 A | * | 5/1991 | Hancock et al. | 310/168 |
| 5,049,801 A | * | 9/1991 | Potter | 318/785 |
| 5,514,943 A | * | 5/1996 | Shapess | 318/772 |
| 5,650,707 A | | 7/1997 | Lipo et al. | |
| 6,008,616 A | | 12/1999 | Nagayama et al. | |
| 6,492,756 B1 | | 12/2002 | Maslov et al. | |

FOREIGN PATENT DOCUMENTS

| | | |
|---|---|---|
| DE | 19 65 085 A | 7/1971 |
| EP | 0 124 698 A | 11/1984 |

OTHER PUBLICATIONS

Osama M. et al. "Experimental and Finite Element Analysis of an Electronic Pole–Change Drive", Industry Applications Conference, 1999. 34th IAS annual meeting. Conference record of the 1999 IEEE Phoenix, AZ, UsA Oct. 3–7, 1999, Piscataway, NJ, USA, IEEE, US, Oct. 3, 1999, pp. 914–921.

* cited by examiner

*Primary Examiner*—Rita Leykin
(74) *Attorney, Agent, or Firm*—McDermott Will & Emery LLP

(57) ABSTRACT

A permanent magnet motor includes salient pole stator cores. The poles and/or linking portions therebetween are wound with a plurality of winding coil sets. Mutually exclusive speed ranges are established between startup and a maximum speed at which the motor can be expected to operate. A different number of the motor stator winding coils are designated to be energized for each speed range for maximum operating efficiency. The number of energized coils are changed dynamically as the speed crosses a threshold between adjacent speed ranges.

17 Claims, 6 Drawing Sheets

MULTIPHASE MOTOR HAVING WINDING CONNECTIONS SPECIFIC TO RESPECTIVE OPERATING SPEED RANGES

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, and copending U.S. application Ser. No. 10/173,610 of Maslov et al., filed Jun. 19, 2002, all commonly assigned with the present application. The disclosures of these applications are incorporated by reference herein.

FIELD OF THE INVENTION

The present invention relates to controlled energization of electric motors, more particularly to applying power on a dynamic basis to an optimum number of coils wound on stator poles for maximum efficiency for each of a plurality of operating speed ranges.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved.

The above-identified copending related U.S. patent application of Maslov et al., Ser. No. 09/826,423, identifies and addresses the need for an improved motor amenable to simplified manufacture and capable of efficient and flexible operating characteristics. In a vehicle drive environment, it is highly desirable to attain smooth operation over a wide speed range, while maintaining a high torque output capability at minimum power consumption. The copending related U.S. application incorporates electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments.

The Maslov et al. applications recognize that isolation of the electromagnet groups permits individual concentration of flux in the magnetic cores of the groups, with virtually no flux loss or deleterious transformer interference effects with other electromagnet members. Operational advantages can be gained by configuring a single pole pair as an autonomous electromagnet group. Magnetic path isolation of the individual pole pair from other pole groups eliminates a flux transformer effect on an adjacent group when the energization of the pole pair windings is switched.

The above-identified copending U.S. patent application Ser. No. 10/173,610 is directed to a control system for a multiphase motor having these structural features. A control strategy is described that compensates for individual phase circuit characteristics and offers a higher degree of precision controllability since each phase control loop is closely matched with its corresponding winding and structure. Control parameters are specifically matched with characteristics of each respective stator phase. Successive switched energization of each phase winding is governed by a controller that generates signals in accordance with the parameters associated with the stator phase component for the phase winding energized.

While the motors described in the above-identified applications provide operational advantages, these motors and prior art motors do not exhibit uniformly high efficiency at all speeds of a wide operating speed range, even with non-variable loads. For a fixed motor topology, the available magnetomotive force (MMF) is dependent upon the number of winding turns and energization current. The term "motor topology" is used herein to refer to physical motor characteristics, such as dimensions and magnetic properties of stator cores, the number of coils of stator windings and wire diameter, etc. The available magnetomotive force dictates a variable, generally inverse, relationship between torque and speed over an operating range. An applied energization current may drive the motor to a nominal operating speed. As the motor accelerates toward that speed, the torque decreases, the current drawn to drive the motor decreases accordingly, and thus efficiency increases to a maximum level. As speed increases beyond the level of peak efficiency, additional driving current is required, thereby sacrificing efficiency thereafter. Thus, efficiency is variable throughout the speed range and approaches a peak at a speed well below maximum speed.

Motors with different topologies obtain peak efficiencies at different speeds, as illustrated in FIG. 1. This figure is a plot of motor efficiency versus operating speed over a wide speed range for motors having different topologies. The topologies differ solely in the number of stator winding turns. Each efficiency curve approaches a peak value as the speed increases from zero to a particular speed and then decreases toward zero efficiency, the curve being generally symmetrical. Curve A, which represents the greatest number of winding turns, exhibits the steepest slope to reach peak efficiency at the earliest speed V2. Beyond this speed, however, the curve exhibits a similarly steep negative slope. Thus, the operating range for this motor is limited. The speed range window at which this motor operates at or above an acceptable level of efficiency, indicated as X% in the figure is relatively narrow. Curves B-E successively represent with fewer winding turns. As the number of winding turns decreases, the slope of each efficiency curve decreases and the speed for maximum efficiency increases. Curve B attains peak efficiency at speed V3, curve C at V4, curve D at V5 and curve E at V6. As the negative slope of each curve beyond the peak efficiency speed is of similar configuration to the initial slope, the acceptable efficiency speed range window increases.

In motor applications in which the motor is to be driven over a wide speed range, such as in a vehicle drive environment, FIG. 1 indicates that there is no ideal single motor topology that will provide uniformly high operating efficiency over the entire speed range. For example, if the maximum operating speed is to be V6 or greater, motor topologies for curves A and B indicate zero efficiency at maximum speed, while curve C exhibits significantly lower efficiency than curves D and E. At the lower end of the speed range, for example between V1 and V3, curves D and E indicate significantly lower efficiency than the other curves.

In motor vehicle drives, operation efficiency is particularly important as it is desirable to extend battery life and thus the time period beyond which it becomes necessary to recharge or replace an on-board battery. The need thus exists for motors that can operate with more uniformly high efficiency over a wider speed range than those presently in use.

DISCLOSURE OF THE INVENTION

The present invention fulfills the above-described needs of the prior art and provides additional advantages for configurations such as the isolated individual stator core arrangements disclosed in the above identified Maslov et al. applications. Advantages are obtained, at least in part, by changing motor topology on a dynamic basis to obtain maximum efficiency for each of a plurality of operating speed ranges. A plurality of mutually exclusive speed ranges between startup and a maximum speed at which a motor can be expected to operate are identified and a different number of the motor stator winding coils that are to be energized are designated for each speed range. The number of energized coils are changed dynamically when the speed crosses a threshold between adjacent speed ranges.

Although the concepts of the present invention are applicable to a motor of any stator configuration, including a single unitary core structure, the motor illustrated for purposes of explanation has a plurality of salient pole stator core segments, each core segment corresponding to a motor phase having a winding comprising a plurality of sets of coils. Each core segment winding may be comprised of a plurality of individually separate coil sets or of a single winding with coil sets separated by tap connections. Preferably, a plurality of stator core segments are ferromagnetically isolated from each other, each core formed by a pole pair, and the coil sets of each winding are serially connected to each other at respective taps, each respective tap corresponding to a respective portion of the speed range.

At starting, all coils of each core segment winding can be energized to start motor rotation. As speed accelerates, a set of coils of each phase winding is de-energized as a speed range threshold is exceeded, while maintaining energization of the remaining coils of each core segment winding. Another set of coils is de-energized for each succeeding speed range. If the motor decelerates below a speed range threshold, a de-energized coil set is re-energized. The motor energizing source may be a switch controlled direct current source that produces desired motor current waveform profiles in accordance with signals generated by a controller. An electronic switch may be connected between each tap and one terminal of the energizing source. In response to sensed speed, a controller generates switch activation signals to be applied to the appropriate switch of each phase winding to supply energizing current to the corresponding tap. A single controller can be provided for both of these functions.

Each core segment may correspond to one phase of a multiphase motor wherein each core segment winding has the same total number of turns. Preferably, in such configuration the number of taps is the same for each core segment winding and the number of coil turns between taps is the same for each core segment winding. Each pole of a segment pole pair may have a winding formed thereon, or the coils of each winding may be distributed on both poles of the respective pole pair, or the winding may be formed on a portion linking both poles of a pole pair.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 2:
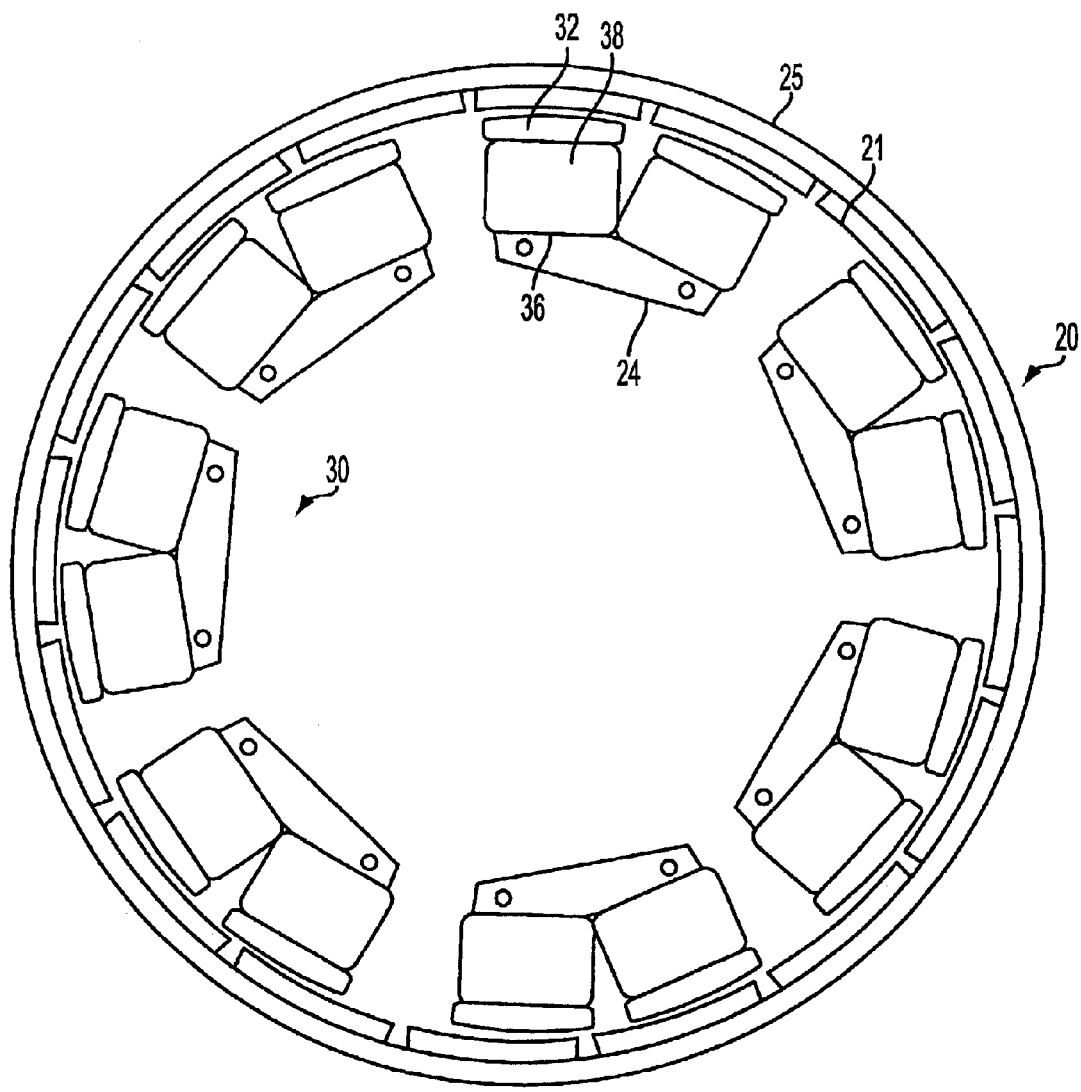
FIG. 2 is an exemplary view showing rotor and stator elements in a configuration that may be employed in the present invention.

FIG. 2 is an exemplary view showing rotor and stator elements such as described in more detail in the above-identified copending Ser. No. 09/826,422 application. Rotor member 20 is an annular ring structure having permanent magnets 21 spaced from each other and substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally u-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. Appropriate stator support structure, which has not been illustrated herein so that the active motor elements are more clearly visible, can be seen in the aforementioned patent application.

Figure 3:
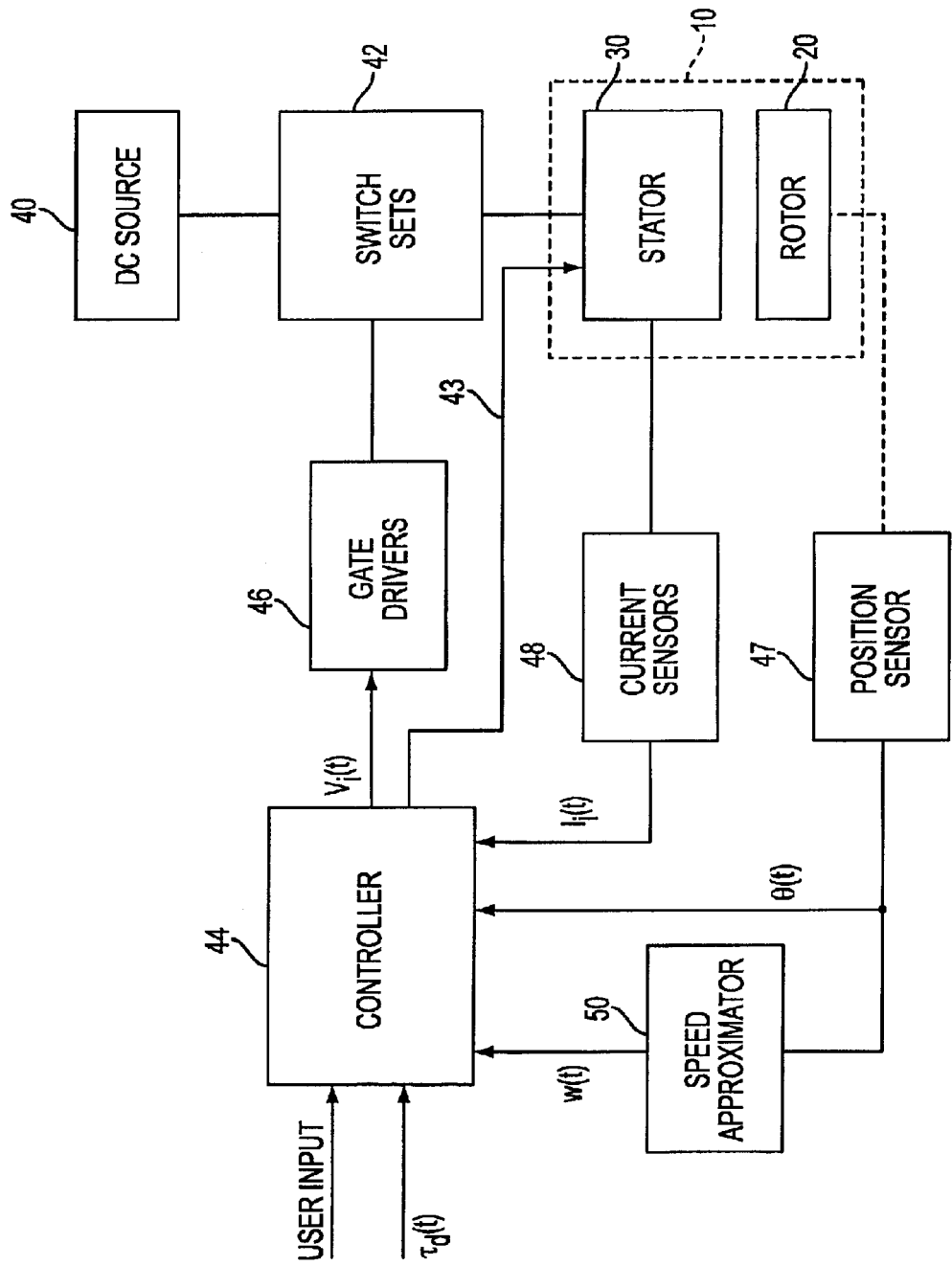
FIG. 3 is a block diagram of a motor control system applicable to the present invention.

FIG. 3 is a block diagram of a motor control system, such as disclosed in the above-identified copending application Ser. No. 10/173,610 and further comprising elements for control of the present invention. Multiphase motor 10 comprises rotor 20 and stator 30. The stator has a plurality of phase windings that are switchably energized by driving current supplied from d-c power source 40 via electronic switch sets 42. The switch sets are coupled to controller 44 via gate drivers 46. The manner in which these switch sets are controlled is not of particular focus for the present invention. As described more fully in the copending application Ser. No. 10/173,610, controller 44 may have one or more user inputs and a plurality of inputs for motor conditions sensed during operation. Current in each phase winding can be sensed by a respective one of a plurality of current sensors 48 whose outputs are provided to controller 44. The controller may have a plurality of inputs for this purpose or, in the alternative, signals from the current sensors may be multiplexed and connected to a single controller input. Rotor position sensor 47 is connected to another input of controller 44 to provide position signals thereto. The output of the position sensor is also applied to speed approximator 50, which converts the position signals to speed signals to be applied to another input of controller 44. The copending application specifically identifies commonly available products that are suitable for each of these elements represented in the figure. In accordance with the present invention, the controller 44 has an additional output line 43, which represents a plurality of control lines as described below, coupled to the stator windings 38.

Figure 4:
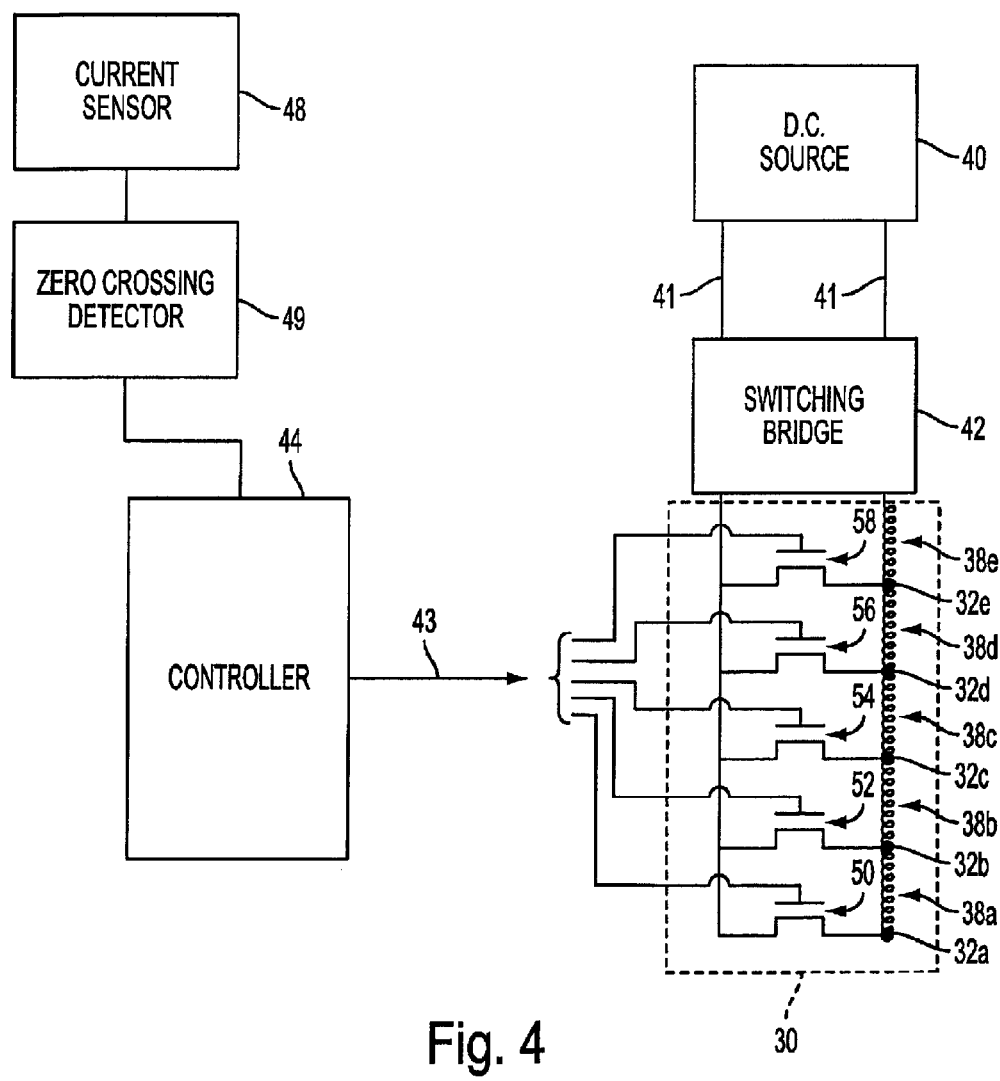
FIG. 4 is a block diagram including circuit connections for control of the motor stator phase windings in accordance with the present invention.

FIG. 4 is a block diagram with illustration of circuit connections for control of the motor stator phase windings according to the present invention. While only one phase winding is shown for clarity of illustration, the figure is representative of the connections for each stator winding. Terminals of D.C. source 40 are connected by lines 41 to a switching bridge 42. Connected in series with one output of the switching bridge is a phase winding 38 of stator 30. The phase winding contains relatively equally spaced taps 32a–32e that define coil sets 38a–38e of the winding 38. Each of the taps is connected to the other output of the switching bridge 42 by a respective FET switch 50, 52, 54, 56 or 58. The FET switches are activated by signals applied to their gates from controller 44 via line 43. Controller 44 comprises an input for receiving a signal from zero crossing detector 49. The zero crossing detector 49 is connected to current sensor 48 and applies zero current crossing signals to the controller that indicate when the current sensed by current sensor 48 is zero. Each switch when activated will complete a connection placing the coils between the first switching bridge output and its respective tap across the output of the switching bridge.

Figure 1:
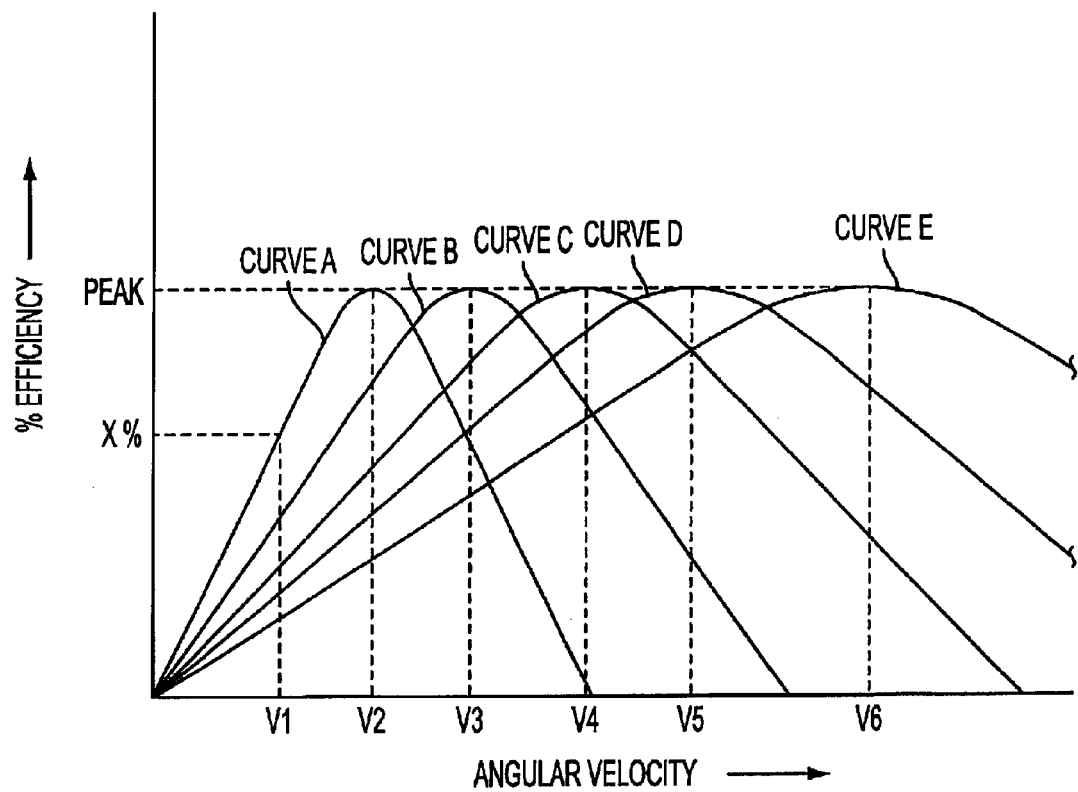
FIG. 1 is a plot of motor efficiency versus operating speed over a wide speed range for motors having different topologies.

In operation, controller 44 will output an activating signal to the gate of one of the FET's 50–58 for each motor phase winding in dependence upon the sensed speed input received from speed approximator 50 (FIG. 3). Only one of the FET's for a phase winding will be rendered conductive at any time. In the controller's memory each switch is associated with a speed range subset of the entire speed operating range as depicted in FIG. 1. In the illustrated example, five speed range subsets are established, one for each FET and its respective winding tap. Boundary thresholds for the speed range subsets are established to optimize efficiency of operation over the entire speed operating range. Thus thresholds in this example are set at intersections between curve A and curve B, between curve B and curve C, between curve C and curve D and between curve D and curve E.

In order to avoid destruction of the FET's, switching on or off of an FET occurs when there is zero current flow thus maintaining a safe voltage threshold for FET activation. Current flow is affected by the back emf and terminal voltage. Thus the zero crossing detector, which receives output from the current sensor, applies zero current signals to the controller for commanding FET's 50–58 to transition from one winding tap to the next.

As described above with respect to FIG. 1, each curve represents efficiency characteristics for a different number of energized stator coils, the peak efficiency occurring at higher speeds for curves representing decreasing numbers of turns. To obtain optimum efficiency over the entire operating range, the maximum number of coils for curve A should be energized from speed zero to the speed threshold at which curves A and B intersect, and thereafter the coils represented by curves B through E should be energized successively between successive speed range subsets defined by the threshold values. A plot of efficiency of such operation over the speed range is shown as curve F in FIG. 5. This curve comprises the maximum efficiency values of each of the component curves, as only the most efficient winding arrangement is energized in each speed range subset. Speed threshold values $\omega_{Ti}$ for the speed ranges are shown.

Figure 6:
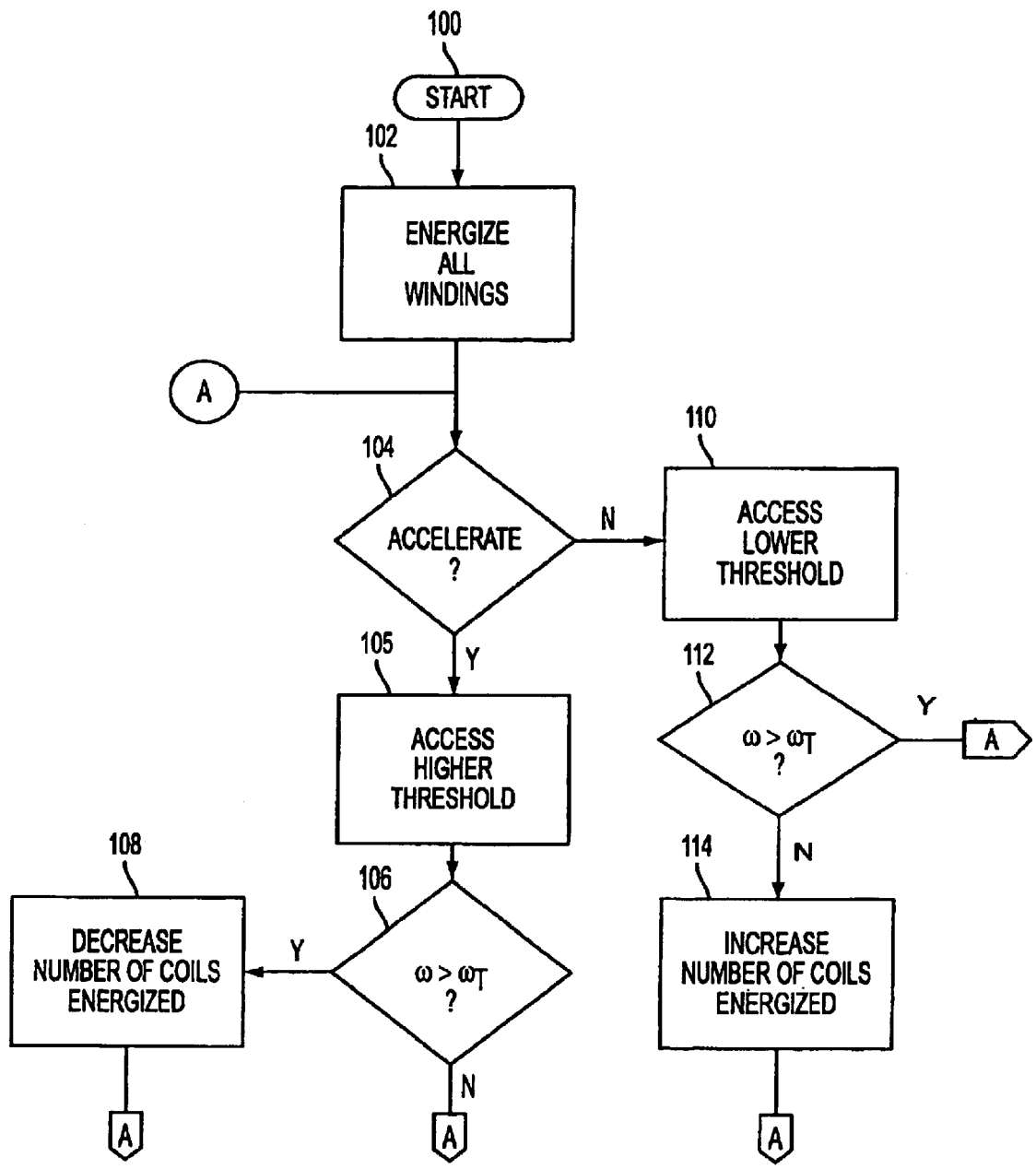
FIG. 6 is a flow chart of operation in accordance with one aspect of the present invention.

An operational flow chart for the illustrated example is shown in FIG. 6. Upon starting the motor at step 100, all stator coils are to be energized at step 102 to provide the curve A portion of curve F. At this time the controller outputs and maintains an activation signal to FET 50 of each of the winding phases. The activation signal is not applied to the other FET's. All winding coil sets 38a–38e are connected in series via tap 32a across the output of the switching bridge. The motor begins operation and the speed is sensed by position sensor 46 and speed approximator 50, which provides a speed feedback signal to the controller 44. At the decision block in step 104, positive acceleration is sensed by the controller, which is set at step 105 to access the higher speed threshold value for the speed range of the sensed speed. The first such threshold, $\omega_{T1}$, is the speed at which curves A and B of FIG. 1 intersect. Flow proceeds to step 106 in which the decision block determines whether the speed has reached the threshold $\omega_{T1}$. The controller compares the speed feedback with the threshold to make this determination. If the speed has not exceeded the threshold, activation of FET 50 is maintained and the negative determination in step 106 directs flow back to step 104 (A). Operational flow continues in this manner until the speed threshold is exceeded or negative acceleration is sensed.

If the speed has exceeded threshold value $\omega_{T1}$, as determined in step 106, at the next received zero crossing detector signal the controller applies the activating signal to FET 52, which is associated with the next higher speed range, at step 108. The activation signal is no longer applied to FET 50. As FET 50 is no longer activated, energization of coil set 38a ceases. Thus, in this speed range only coil sets 38b–38e are connected in series via tap 32b across the output of the switching bridge. Flow returns to step 104 (A), in which acceleration is sensed, and to step 105, in which the controller is set to access the higher speed threshold value of the new speed range. This threshold $\omega_{T2}$ is the speed at which curves B and C of FIG. 1 intersect. Steps 104–108 continue in this manner until deceleration is sensed. Each positive determination in step 106 effects, at step 108, a change in FET activation whereby fewer stator winding coils are connected across the output of the switching bridge.

If deceleration (negative acceleration) is sensed in step 104, the controller is set to access the lower speed threshold value of the speed range at step 110. At step 112, the controller compares the speed feedback with the lower threshold to determine whether the speed is within a lower operating range. If not, no change in FET activation is made and operational flow returns to step 104 (A). Operational flow continues in this manner until the speed threshold is traversed or positive acceleration is sensed.

If it is determined in step 112 that the sensed speed is less than the set lower threshold, at the next received zero crossing detector signal the controller applies the activating signal to the FET that is associated with the next lower speed range, at step 114 while discontinuing activation of higher speed range FET. This activation adds another coil set to the series connection of coils sets across the output of the switching bridge. Flow returns to step 104 (A). Thus during motor operation, energization is obtained for the optimum number of coil sets for the entire operating speed range, conforming to the efficiency curve F of FIG. 5.

Figure 5:
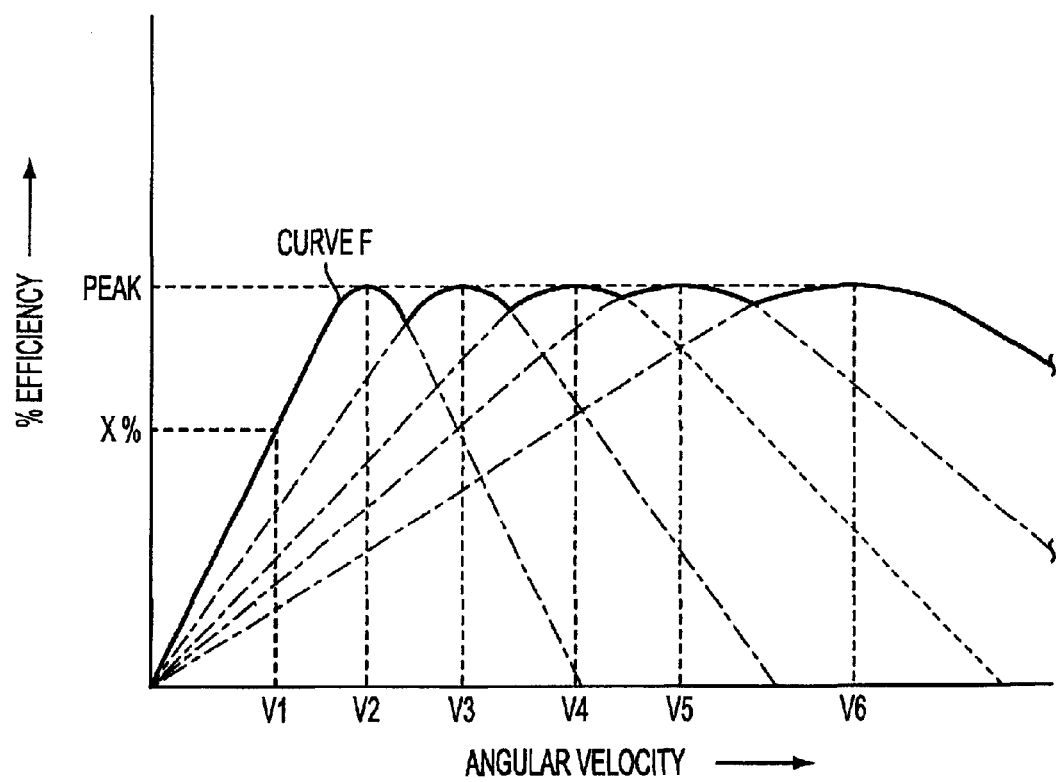
FIG. 5 is a plot of efficiency for a range of speed operation in accordance with the present invention.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, motor topologies can vary significantly for different numbers of poles, pole dimensions and configurations, pole compositions, etc. Different numbers of coil sets and speed range subsets can be chosen to suit particular topologies. Placement of the taps may be varied to meet optimum efficiency curves for different configurations. Threshold levels may be adjusted to increase and/or decrease one or more speed ranges, thus setting a more even or uneven speed range subset distribution. Thus, FIG. 5 is a simplified representation of the inventive concept and vary in dependence upon these various factors.

What is claimed is:

1. A method for dynamically controlling a motor having a plurality of salient pole stator core segments that are ferromagnetically isolated from each other, each core segment having a plurality of sets of coils wound thereon to form a core segment winding, the method comprising the steps of:

energizing all coils of each core segment winding to start motor rotation;

determining whether the motor has accelerated to a predetermined threshold speed; and in response to the motor having obtained the predetermined threshold speed as determined in said determining step, de-energizing one of said plurality of sets of coils of each core segment winding while maintaining energization of the remaining coils of each core segment winding.

2. A method as recited in claim 1, wherein said predetermined threshold speed is related to motor operational efficiency and the motor operates at a speed range greater than the predetermined speed threshold without substantial loss of efficiency.

3. A method for dynamically controlling a motor having a plurality of salient pole stator core segments, each core segment having a plurality of sets of coils wound thereon to form a core segment winding, the method comprising the steps of:

energizing all coils of each core segment winding to start motor rotation;

determining whether the motor has accelerated to a predetermined threshold speed;

in response to the motor having obtained the predetermined threshold speed as determined in said determining step, de-energizing one of said plurality of sets of coils of each core segment winding while maintaining energization of the remaining coils of each core segment winding; and determining whether the speed of the motor has exceeded another predetermined speed threshold; and in response to the motor having obtained said another predetermined threshold speed as determined in said further determining step, de-energizing an additional one of said plurality of said sets of coils of each core segment winding while maintaining energization of the remaining coils of each core segment winding.

4. A method as recited in claim 3, comprising the further steps of:

determining whether the motor has decelerated below one of said threshold speeds; and in response to a deceleration determination, energizing one or more of the previously de-energized sets of coils of each core segment winding.

5. A method as recited in claim 3, wherein said steps of determining and de-energizing are repeated until the motor obtains a maximum speed range with only one of said plurality of sets of coils of each core segment winding energized.

6. A method for dynamically controlling a motor having a plurality of salient pole stator core segments, each core segment having a plurality of sets of coils wound thereon to form a core segment winding, the method comprising the steps of:

establishing a plurality of mutually exclusive speed ranges between startup and a maximum speed;

designating which sets of coils of each core segment winding are to be energized for each speed range;

connecting an energy source to the core segment windings to start motor rotation;

determining when the motor speed changes from a first one of said speed ranges to a second one of said speed ranges; and changing an existing connection of the energy source to the sets of coils designated for the second speed range in response to the determining step.

7. A method as recited in claim 6, wherein said step of designating comprises identifying an optimum number of coil sets to be energized for maximum operating efficiency in each of said speed ranges.

8. A method as recited in claim 7, wherein the designated number of coil sets is decreased for each increased speed range.

9. A method as recited in claim 6, wherein said first speed range is lower than said second range and the changing step comprises reducing the number of energized coil sets.

10. A method as recited in claim 6, wherein said first speed range is higher than said second range and the changing step comprises increasing the number of energized coil sets.

11. A motor control system comprising:

a motor having a plurality of salient pole stator core segments that are ferromagnetically isolated from each other, each core segment having a plurality of sets of coils wound thereon to form a core segment winding, said motor operable over an entire speed range that comprises a plurality of speed range subsets;

a controlled energy source;

a controller having stored therein a plurality of settings respectively corresponding to each said speed range subset; and means for applying said controlled energy source to a prescribed number of coil sets of each winding in response to said controller, the prescribed number corresponding to one of said settings for a speed range subset.

12. A motor control system as recited in claim 11, wherein each core is formed by a pole pair, and the coil sets of each winding are serially connected to each other at respective taps, each respective tap corresponding to said respective portion of the speed range.

13. A motor control system as recited in claim 12, wherein each core segment is one phase of a multiphase motor and each core segment winding has the same total number of turns.

14. A motor control system as recited in claim 12, wherein the number of taps is the same for each core segment winding and the number of coil turns between taps is the same for each core segment winding.

15. A motor control system as recited in claim 12, wherein the coils of each winding are distributed on both poles of the respective pole pair.

16. A motor control system as recited in claim 12, wherein the means for applying comprises, for each stator core segment, a switch connected between the controlled energy source and a respective winding tap.

17. A motor control system as recited in claim 11, wherein said controller is connected to the controlled energy source and to the means for applying; and the motor control system further comprises:

a motor speed sensor; wherein said controller regulates the application of energizing current to the motor and is responsive to the speed sensor to activate appropriate ones of the controlled switches.

* * * * *